Figure 1:
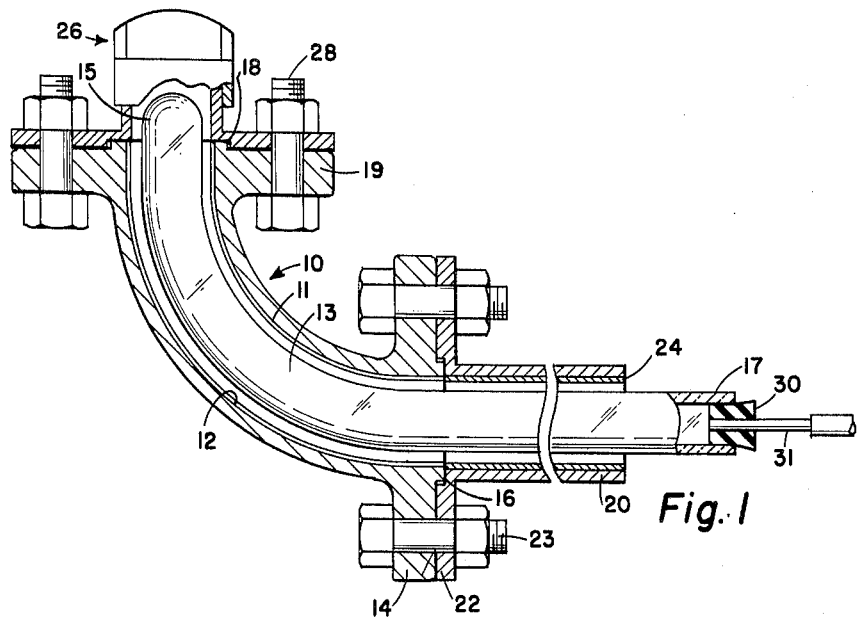

INVENTOR.
HERBERT F. YOUNG

BY

ATTORNEYS

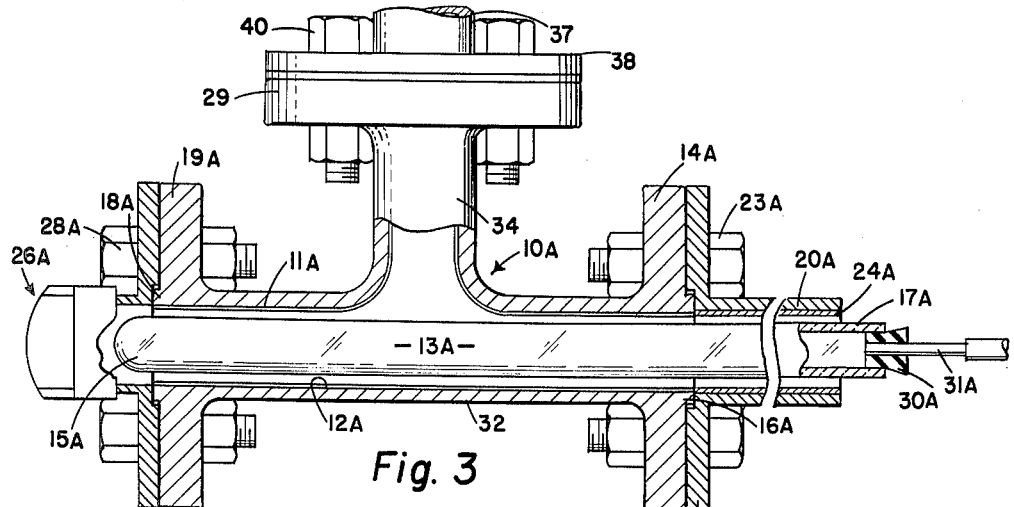
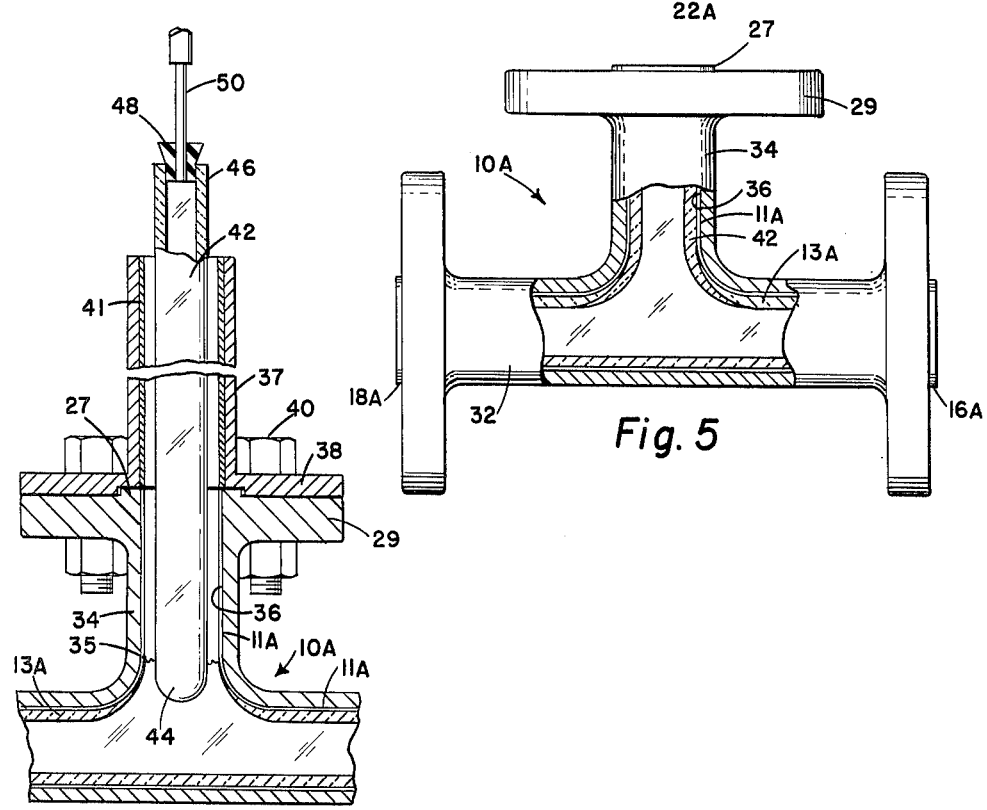

United States Patent Office 3,235,290
Patented Feb. 15, 1966

3,235,290
GLASS LINED FITTING AND PROCESS FOR GLASS LINING OF PIPE FITTING
Herbert F. Young, West Webster, N.Y., assignor to Pfaudler Permutit, Inc., Rochester, N.Y., a corporation of New York
Filed Dec. 7, 1960, Ser. No. 74,357
7 Claims. (Cl. 285—55)

This invention relates to glass lined metal pipe fittings and a process for making the same, one object of this invention being the provision of superior fittings of this nature.

In the past, it has been very difficult and expensive to line pipe fittings with glass having sufficient integrity for severe service such as the handling of corrosive acids. Heretofore, glass lining of pipe fittings has most commonly been accomplished by one of two methods. The first method consists of spraying a finely powdered glass on the inner surface of the heated pipe fitting and thereafter raising the temperature of the fitting in a furnace until the glass fuses to the metal. A second method of glass lining pipe fittings has been to spray liquid enamel slip on the inside of the pipe fittings, letting the slip dry and then firing the composite metal and internal glass lining in a furnace to fuse the two together.

With both of these processes, it has been necessary to repeat the described steps a number of times in order to produce a sufficiently thick coating of glass in the pipe fitting to avoid small holes in the coating which would expose the metal pipe fitting to corrosive acids or other materials ultimately to be conveyed through the pipe fittings. Both of these methods have been most unsatisfactory because of the difficulty in coating the inside surfaces of the fittings, the non-uniform thickness of the glass lining, the time and labor required to apply the numerous coats of enamel, the possibility of holes in the lining, and also because of the attendant warping of the fitting which increases with each firing of the fitting.

I have discovered a novel process for applying a substantially uniform glass lining internally of the pipe fitting in a simple, relatively inexpensive and superior manner. This process produces a thick, uniform and reliable glass lining.

It is one object of my invention to provide a novel metal pipe fitting having angularly disposed portions, all of which are glass lined by my novel and unique process.

Another object of my invention is to provide a glass lined metal pipe fitting which is lined by a process which greatly reduces the heretofore required manual labor.

A significant object of my invention is to provide a flanged glass lined metal pipe fitting which, in the finished form, provides a smooth gasket seating surface at all open ends of the fitting, manufactured by a process which eliminates the heretofore commonly practiced method of finishing the ends of the fitting with gasket facing surfaces and threading the terminal portions of the pipe fitting to receive threaded flange members.

An important object of my invention is to provide glass lined metal pipe fittings and processes for manufacturing glass lined metal pipe fittings with flanges linearly spaced from all open ends of the pipe fitting, thereby enabling the open ends of the pipe fitting to be finished to provide smooth gasket facing surfaces without grinding the flanges.

Still another object of my invention is to provide a process for glass lining metal pipe fittings which minimizes warping which results from reheating of the pipe fitting.

Other objects and advantages of my invention will be particularly set forth in the claims and will be apparent from the following description of two embodiments of my invention made in connection with the accompanying drawings.

Figure 2:
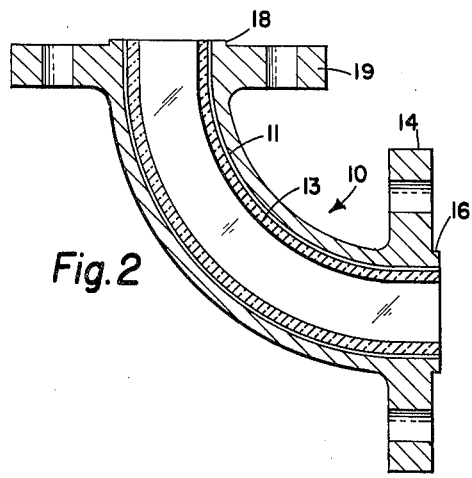

In the drawings:
FIG. 1 is a sectional view with parts broken away of one embodiment of my invention illustrating a method of glass lining a hollow metal pipe fitting;
FIG. 2 is a sectional view of my completed novel glass lined hollow metal pipe fitting shown in FIG. 1;
FIG. 3 is a fragmentary sectional view with parts broken away illustrating a novel process at a corresponding stage to that shown in FIG. 1 of a second embodiment of my invention;
FIG. 4 is a sectional view of a fragment of the same embodiment illustrated in FIG. 3, illustrating a second step in a method of glass lining the pipe fitting shown in FIG. 3; and
FIG. 5 is a fragmentary sectional view illustrating the completed glass lined pipe fitting illustrated in FIGS. 3 and 4.

First, I shall describe only the basic steps of the glass lining processes illustrated and described more in detail hereinafter.

Referring to FIG. 1, I have illustrated a metal pipe fitting, in this case an elbow, generally indicated by the numeral 10. Pipe fitting 10 has a bore 12 which is preferably coated with at least one glass ground coat 11. A glass liner 13 conforming generally to the shape of the bore 12 and having a closed end 15 is inserted in bore 12 of pipe fitting 10.

After the glass liner 13 is inserted in the bore 12, they are heated in the furnace until the glass liner 13 and the ground coat 11 become viscid and tacky. Then, air pressure is applied through an open end 17 of the glass liner 13 to radially expand the glass liner 13 until it engages and fuses with the ground coat 11. This provides a glass lining of substantially uniform thickness extending through the bore 12 and cemented to the metal by the ground coat 11.

In order to perform its function, ground coat 11 must be adhesive to metal as well as glass. Any of the known formulations, well known in the enameling art, will serve this function.

It will be understood that the scope of my invention is not based on the method of how the glass ground coat 11 is applied, if at all, internally of the pipe fitting 10. It will further be understood that my invention contemplates glass lining a pipe fitting even without a ground coat 11, since in certain fittings as, for example T's, the shape of the parts is sufficient to hold the liner in place.

I shall now describe the illustrated embodiments of my invention more in detail. Pipe fitting 10 is provided with two annular flanges 14 and 19 linearly spaced from either end of the fitting 10, thereby providing annular projections 16 and 18. Projection 16 is adapted to abut and mate with a pipe extension member 20. Member 20 has an annular flange 22 which is coupled to flange 14 by a plurality of through bolts 23. It will be noted that the inside bore of pipe extension member 20 is larger in diameter than bore 12 of fitting 10. The bore of member 20 is adapted to receive a lining 24, composed of asbestos or other material to which glass will not adhere, and preferably having an internal diameter equal to that of the pipe fitting bore 12.

Projection 18 abuts and mates with a flanged closure member, generally indicated by the numeral 26, which is coupled to flange 19 by a plurality of through bolts 28.

After fitting 10 has been coated with at least one ground coat 11, capped by closure member 26 and coupled with extension member 20 including the insert liner 24, then the glass liner 13 is inserted with the closed end 15 being received by the closure member 26. The open end 17 of the glass liner 13 receives a rubber or other resilient plug 30 having a hole bored transversely therethrough for receiving a tube 31 connected to a source of air pressure (not shown).

After the glass liner 13 is inserted in the pipe fitting 10, the total assembly is inserted into a furnace for firing. At least a portion of the extension member 20, glass non-adhesive liner 24, glass liner 13, plug 30 and tube 31 extend outside of the furnace to enable air pressure to be applied internally of the liner 13 at the appropriate time.

When the temperature of the assembly has been raised to the softening point of the glass lining 13 and ground coat 11, air pressure is applied through tube 31 into glass liner 13, thereby radially expanding the glass liner 13 to engage and fuse with ground coat 11. It will be understood that the closure member 26 prevents the closed end 15 of the glass liner 13 from rupturing when air pressure is applied through the tube 31 to the liner 13.

After the glass liner 13 is fused with the enamel ground coat 11, the entire assembly is removed from the furnace. After cooling, the closure member 26 and extension member 20, with its accompanying glass non-adhesive liner 24, are both uncoupled from the fitting 10, thereby exposing portions of the glass liner 13 extending outside of the fitting 10.

The exposed ends 15 and 17 of the glass liner 13 are cut off susbtantially flush with the projections 16 and 18. The rough ends of the glass liner 13 and the projections 16 and 18 are ground to provide a smooth gasket facing surface adapted to mate with gasket facing surfaces of straight portions of glass lined pipe or other fittings coupled to the annular flanges 14 and 19.

The purpose of the projections 16 and 18 resides in the fact that after the exposed ends 15 and 17 are cut away from the glass liner 13, the projections 16 and 18 and the liner 13 may be ground to provide gasket facing surfaces. This eliminates the necessity of either grinding the flanges 14 and 19 or of threading flanges onto the pipe fitting after the gasket facing surface has been ground on the ends of the fitting 10.

The finished product, after grinding of the projections 16 and 18 and opposite ends of the glass lining 13 is illustrated in FIG. 2.

In FIGS. 3, 4 and 5, I have illustrated a second embodiment of my invention, a glass lined T. I have used the same numerals followed by the suffix "A" to designate parts corresponding to those illustrated in FIGS. 1 and 2.

Referring to FIGS. 3 and 4, fitting 10A has a horizontal portion 32 provided with annular flanges 14A and 19A and an intersecting vertical portion 34 which is provided with an annular flange 29 linearly spaced from the upper end to provide an annular projection 27.

Initially, a ground coated bore 36, extending through portion 34 and intersecting bore 12A, is open to the atmosphere. After the assembly, comprising the fitting 10A, closure member 26A, extension member 20A with the glass non-adhesive lining 24A and the glass liner 13A inserted therein, has been fired in the furnace so the glass liner 13A and ground coat 11A have become viscid, air pressure is applied through a tube 31A to the inside of liner 13A.

After the liner 13A has been radially expanded, by the air pressure, to engage and fuse with the ground coat 11A, pressure continues to be exerted through tube 31A, to thereby rupture the glass liner 13A at substantially the intersection of bores 12A and 36 of the fitting 10A. The air pressure forces the exterior circumference of the ruptured portion of liner 13A to engage and fuse with the ground coat 11A at the mouth of the bore 36 where it intersects with bore 12A. This is illustrated in FIG. 4 where the liner 13A will be seen to diminish in thickness until it reaches an uppermost circumference 35 of the ruptured portion of the glass liner.

After the horizontal portion 32 has been glass lined, the resilient plug 30A (FIG. 3) is removed. Then, a pipe extension member 37 having an annular flange portion 38 is shouldered against projection 27 and coupled to the annular flange 29 by a plurality of through bolts 40. Also, an asbestos or glass non-adhesive liner 41 is provided internally of the pipe extension member 37 to abut vertical portion 34 in the same manner described with reference to flanges 14A and 19A.

A second glass liner 42, having a closed end 44 and an open end 46 is inserted through the pipe extension member 37 and vertically extending portion 34 of the pipe fitting 10A until the lowermost closed end 44 has at least traversed the uppermost circumference 35 of the ruptured portion of liner 13A. The open end 46 of the glass liner 42 is plugged with a rubber or resilient plug 48, which plug is transversely bored for receiving a tube 50 connected to a source of air pressure (not shown).

The entire assembly is once again placed into a furnace for firing with at least the upper ends of vertical portion 34, pipe extension member 37, asbestos lining 41, and glass liner 42 extending out of the furnace in the same manner as described with regard to corresponding parts in FIG. 3.

The glass liners 42 and 13A and the ground coat 11A of bore 36 are rendered viscid by the heat in the furnace. After reaching the viscid state, air pressure is applied internally of the glass lining 42 to radially expand it to engage and fuse with the adjacent ground coat 11A. Air pressure continues to be applied internally of the glass liner 42, thereby to rupture the closed end 44 and force the ruptured end radially outward to fuse with the exterior surface of the now viscid, upwardly extending ruptured portion of the glass liner 13A. This provides a fused, lap joint at the mouth of the intersecting bores 12A and 36 of the pipe fitting 10A as is illustrated in FIG. 5.

Next, the plug 48 and tube 50 are removed from the glass liner 42. The pipe extension member 37 and glass non-adhesive or asbestos liner 39 are uncoupled and removed from the glass liner 42. The closure member 26A is then removed to expose the closed end of liner 13A.

The two exposed portions of the glass liner 13A and the uppermost exposed portion of the glass liner 42 are all cut off substantially flush with the flanges 14A, 19A and 29. Thereafter, the three annular pipe fitting projections 16A, 18A and 27 are all ground to provide smooth gasket facing surfaces in the same manner as described with regard to flanges 14 and 19.

Thus, I provide a finished, glass lined pipe fitting which is illustrated in FIG. 5.

While I have shown and described the preferred forms of my invention, it will be apparent that various modifications and changes may be made therein, particularly in the form and relation of parts, without departing from the spirit of my invention as set forth in the appended claims.

I claim:

1. A process for manufacturing glass lined metallic pipes having at least one open end comprising the steps of: providing a flange on said pipe linearly spaced from said open end, glass lining said pipe, and grinding only that portion of said glass lined pipe intermediate said open end and said flange, thereby providing a gasket facing surface at the open end of said pipe being linearly spaced from said flange.

2. A process for manufacturing glass lined metallic pipes having at least one open end comprising the steps of: forming a flange on said pipe linearly spaced from said open end, glass lining said pipe, and grinding only that portion of said glass lined pipe intermediate said open end and said flange, thereby providing a gasket facing surface at the open end of said pipe.

3. A process for manufacturing glass lined metallic pipes having at least one open end comprising the steps of: forming a flange on said pipe linearly spaced from said open end; inserting a glass liner into said pipe with the glass lining extending out of the open end of said pipe; heating said pipe until viscid; radially expanding said glass liner into engagement with the bore of said pipe; severing the portion of the glass liner protruding from the open end of said pipe; and grinding only that portion of the said glass lined pipe intermediate said open end and said flange thereby providing a gasket facing surface at the open end of said pipe.

4. A process for manufacturing glass lined metallic pipes having at least one open end comprising the steps of: providing a flange on said pipe linearly spaced from said open end; attaching a pipe extension means to said pipe fitting at said open end; inserting a glass liner into said pipe with the glass lining extending out of the open end of said pipe and into said extension; heating said pipe until viscid; radially expanding said glass liner into engagement with the bore of said pipe; severing the portion of the glass liner protruding from the open end of said pipe; and grinding only that portion of the said glass lined pipe intermediate said open end and said flange thereby providing a gasket facing surface at the open end of said pipe.

5. A process in accordance with claim 4 in which said pipe extension means has a non-adhesive inner lining.

6. A process for manufacturing glass lined metallic pipes having at least one open end and an integral flange spaced from said open end comprising the steps of: glass lining said pipe, and grinding only that portion of said glass lined pipe intermediate said open end and said flange, thereby providing a gasket facing surface at the open end of said pipe being linearly spaced from said flange.

7. A metal glass lined pipe comprising, in combination, a glass lined metallic pipe fitting having at least one open end, an integral flange on said fitting linearly spaced from said open end, said glass lined pipe having a ground gasket facing surface at said open end spaced from said flange.

References Cited by the Examiner
UNITED STATES PATENTS

| | | | |
|---|---|---|---|
| 642,537 | 1/1900 | Thoma | 154—82 |
| 642,539 | 1/1900 | Thoma | 154—82 |
| 904,870 | 11/1908 | Heidecke et al. | 285—45 |
| 1,726,483 | 8/1929 | Giesler | 285—45 X |
| 2,629,093 | 2/1953 | Pask et al. | 65—43 X |
| 2,647,070 | 7/1953 | Litton | 65—43 |
| 2,707,850 | 5/1955 | Dalton et al. | 65—43 |
| 2,919,936 | 1/1960 | Hurley | 285—55 |
| 2,957,710 | 10/1960 | Sturgeon | 285—55 |
| 2,986,847 | 6/1961 | Sato | 65—59 X |
| 3,018,090 | 1/1962 | Kaase et al. | 285—45 X |
| 3,061,664 | 10/1962 | Kegg | 65—43 X |

DONALL H. SYLVESTER, *Primary Examiner.*
ARTHUR C. BROWN, JR., *Examiner.*